(12) United States Patent
Jiang

(10) Patent No.: US 10,690,266 B2
(45) Date of Patent: Jun. 23, 2020

(54) SUSPENSION DEVICE

(71) Applicant: Jiangmen Eurofix Metal and Rubber Products Co., Ltd., Jiangmen, Guangdong Province (CN)

(72) Inventor: Shizhong Jiang, Jiangmen (CN)

(73) Assignee: JIANGMEN EUROFIX METAL AND RUBBER PRODUCTS CO., LTD., Jiangmen (CN)

(*) Notice: Subject to any disclaimer, the term of this patent is extended or adjusted under 35 U.S.C. 154(b) by 372 days.

(21) Appl. No.: 15/450,687

(22) Filed: Mar. 6, 2017

(65) Prior Publication Data
US 2018/0252360 A1 Sep. 6, 2018

(51) Int. Cl.
F16L 3/10 (2006.01)
F16L 3/11 (2006.01)

(52) U.S. Cl.
CPC .............. F16L 3/1083 (2013.01); F16L 3/11 (2013.01)

(58) Field of Classification Search
CPC ..... F16L 3/1025; F16L 3/1075; F16L 3/1091; F16L 3/11; F16L 3/14; E21F 17/02; H02G 3/32
USPC ......... 248/58, 62, 63, 74.1; D8/380
See application file for complete search history.

(56) References Cited

U.S. PATENT DOCUMENTS

| | | | | |
|---|---|---|---|---|
| 2,466,247 A * | 4/1949 | Land | ............... | F16L 3/14 248/62 |
| 3,051,424 A * | 8/1962 | Duhamel | ............... | F16L 3/11 248/62 |
| 3,236,482 A * | 2/1966 | Fitzgerald | ............... | F16L 3/133 248/62 |
| 3,462,104 A * | 8/1969 | Muller | ............... | F16L 3/14 248/62 |
| 4,958,792 A * | 9/1990 | Rinderer | ............... | F16L 3/13 24/457 |
| 4,996,749 A * | 3/1991 | Takahashi | ............... | F16L 33/03 24/20 CW |
| 6,138,960 A * | 10/2000 | Carbonare | ............... | F16L 3/1083 248/62 |
| 7,546,986 B2 * | 6/2009 | Kim | ............... | F16L 3/1008 248/62 |
| 8,322,662 B2 * | 12/2012 | Heath | ............... | F16L 3/1091 248/58 |
| 8,833,705 B2 * | 9/2014 | Bragagna | ............... | F16L 59/135 248/58 |
| 9,115,827 B2 * | 8/2015 | Heath | ............... | F16L 3/1091 |

(Continued)

Primary Examiner — Jonathan Liu
Assistant Examiner — Guang H Guan
(74) Attorney, Agent, or Firm — Hauptman Ham, LLP

(57) ABSTRACT

Disclosed is a suspension device comprising an upper connecting member and a lower bearing member. The upper connecting member comprises a first upper jointing portion and a second upper jointing portion, and the lower bearing member comprises a first lower jointing portion and a second lower jointing portion. The first upper jointing portion is provided with a first opening, the first lower jointing portion is substantially T-shaped. The root part of the first lower jointing portion can be rotated freely in the lower part of the first opening. The second upper jointing portion is provided with a second opening and a third opening that are elongated, the second lower jointing portion is provided with a first side plate and a second side plate configured to be inserted into the second opening and the third opening, respectively.

6 Claims, 9 Drawing Sheets

(56) References Cited

U.S. PATENT DOCUMENTS

| | | | | |
|---|---|---|---|---|
| D823,673 S | * | 7/2018 | Jiang | F16M 13/027 |
| | | | | D8/373 |
| 10,295,086 B2 | * | 5/2019 | Juzak | F16L 3/1075 |
| 2011/0084178 A1 | * | 4/2011 | Wiedner | F16L 3/11 |
| | | | | 248/62 |
| 2018/0252360 A1 | * | 9/2018 | Jiang | F16M 13/027 |

* cited by examiner

SUSPENSION DEVICE

FIELD OF THE INVENTION

The present invention relates to a suspension device.

BACKGROUND

Detachable suspension devices recently available on the market generally comprise an upper connecting member, a lower bearing member and a jointing members. The jointing members are normally screws and bolts used to secure the upper connecting member and the lower bearing member together. In this way, a tool is required to screw down the bolts during assembly and unscrew the bolts during disassembly, this is a labor-intensive and time-consuming process. Moreover, in the case of a heavy object born, materials for producing the upper connecting member and the lower bearing member have a considerably large thickness. Moreover, the screws have rather high production costs. Therefore, a suspension device without screws and with ease to disassemble is needed.

SUMMARY

In order to satisfy the recent demands in the market, the present invention provides a suspension device which can be assembled and disassembled quickly, has high structural strength, and can save 80% of the labor in comparison with the existing products on the market according to preliminary statistics.

In order to achieve the above objectives, the present invention provides a suspension device, which comprises:
  an upper connecting member having a first upper jointing portion and a second upper jointing portion; and
  a lower bearing member, connected with the upper connecting member and comprising a first lower jointing portion and a second lower jointing portion, wherein the connection between the upper connecting member and the lower bearing member is achieved through junctions between the first upper jointing portion and the first lower jointing portion and between the second upper jointing portion and the second lower jointing portion;
  wherein the first upper jointing portion is provided with a first opening, the first opening is substantially symmetrical and has an upper part and a lower part, the upper part of the first opening is elongated and has a substantially rectangular shape, the lower part of the first opening is wider and shorter compared to the upper part of the first opening, and the lower part of the first opening has a substantially triangular shape with two opposite sides converging toward the upper part of the first opening;
  wherein the first lower jointing portion is substantially T-shaped having a head part and a root part, and configured to allow the root part of the first lower jointing portion to rotate freely in the lower part of the first opening, and the head part of the first lower jointing portion has a length greater than the maximum width of the lower part of the first opening but less than the overall length of the first opening;
  wherein the second upper jointing portion is provided with a second opening and a third opening, and the second opening and the third opening are elongated; and
  wherein the second lower jointing portion is provided with a first side plate and a second side plate, and the first side plate and the second side plate are configured to be inserted into the second opening and the third opening, respectively.

Preferred, each of the second side plate and the third side plate has an insertion starting end, an insertion finishing end, and a height increasing gradually from the insertion starting end to the insertion finishing end.

Further, the upper connecting member further comprises a supporting member arranged transversely between the first upper jointing portion and the second upper jointing portion.

Further, the suspension device further comprises a fastener configured to be sleeved on the second upper jointing portion.

Preferred, the second upper jointing portion is provided with a first groove extending downwardly from the second opening and a second groove extending downwardly from the third opening, the first groove and the second groove face the first upper jointing portion and are partially disposed on a bent distal tail end of the second upper jointing portion, and the first groove and the second groove are configured for guiding the first side plate to slide into the second opening and guiding the second side plate to slide into the third opening, respectively.

Preferred, the upper connecting member is provided with at least one reinforcing rib.

Preferred, the lower bearing member is provided with at least one reinforcing rib.

On another aspect, the invention provides a method for assembling the suspension device of claim 1, comprising the following steps:
  inserting the head part of the first lower jointing portion into the first opening of the first upper jointing portion;
  rotating the root part of the first lower jointing portion in the lower part of the first opening by an angle to align the second side plate and the third side plate with the second opening and the third opening, respectively; and
  pushing the second side plate and the third side plate, towards the upper connecting member, into the second opening and the third opening, respectively.

The method further comprises: inserting the second side plate and the third side plate into the second opening and the third opening respectively after sleeving the fastener onto the second upper jointing portion, and pressing the fastener towards the lower bearing member onto the joint between the second upper jointing portion and the second lower jointing portion for fastening.

On another aspect, the invention provides a method for disassembling the suspension device of claim 1, comprising the following steps:
  pushing the second side plate and the third side plate towards the upper connecting member to remove the second side plate and the third side plate away from the second opening and the third opening; and
  rotating the root part of the first lower jointing portion in the lower part of the first opening by an angle to align the head part of the first lower jointing portion with the upper part of the first opening, and removing the first lower jointing portion from the first upper jointing portion.

The disassembly method further comprises a step of loosening the fastener before pushing the second side plate and the third side plate towards the upper connecting member.

Further, the steps of disassembling the second lower jointing portion from the second upper jointing portion is carried out manually.

Further, the steps of disassembling the second lower jointing portion from the second upper jointing portion is carried out by a tool.

By directly jointing the upper connecting member and lower bearing member of the suspension device, the product dispenses with screws. Moreover, the jointed upper connecting member and lower bearing member can be assembled and disassembled easily, so that a great deal of manpower is saved. Furthermore, since the upper connecting member and the lower bearing member are provided with the at least one reinforcing rib, the overall structural strength is increased. In addition, the product of the invention has lower costs, excellent load performance, and good applicability.

BRIEF DESCRIPTION OF THE DRAWINGS

In order to make the objectives, technical solution and advantages of the present invention clearer, the present invention is described in detail below with reference to the drawings and specific embodiments, wherein.

DETAILED DESCRIPTION OF THE EMBODIMENTS

Figure 1:
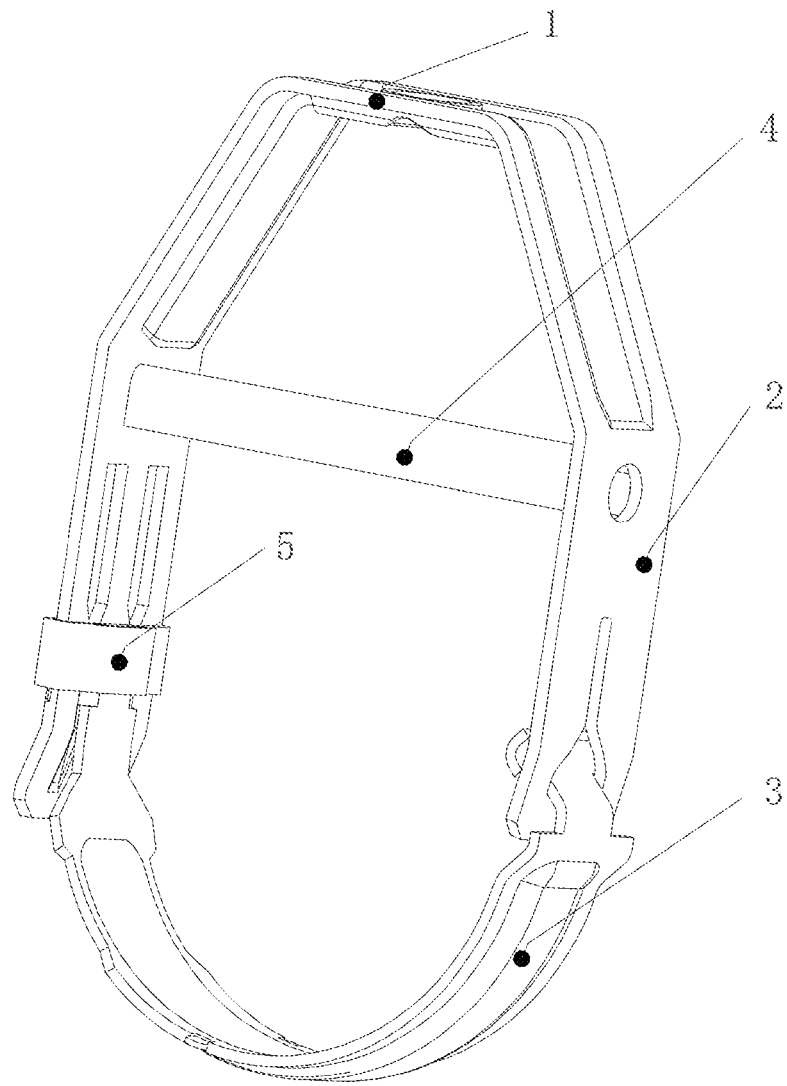
FIG. 1 shows a perspective view of a suspension device in one direction according to one embodiment of the present invention.
Figure 2:
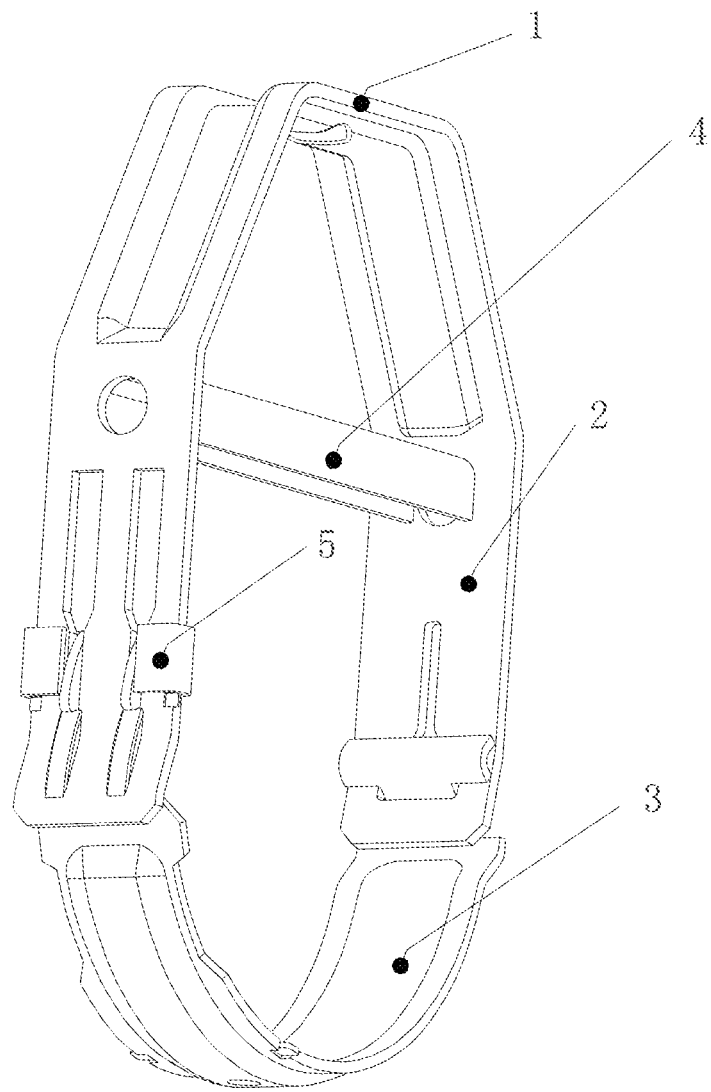
FIG. 2 shows a perspective view of the suspension device in another direction according to one embodiment of the present invention.

FIGS. 1-9 show exemplary embodiments of a suspension device of the present invention, and the specific structural details in each drawing only serves as an exemplary description of the technical solution of the present invention rather than a limitation on the present invention. Like or similar parts or portions have the same reference numerals throughout the drawings.

Figure 3:
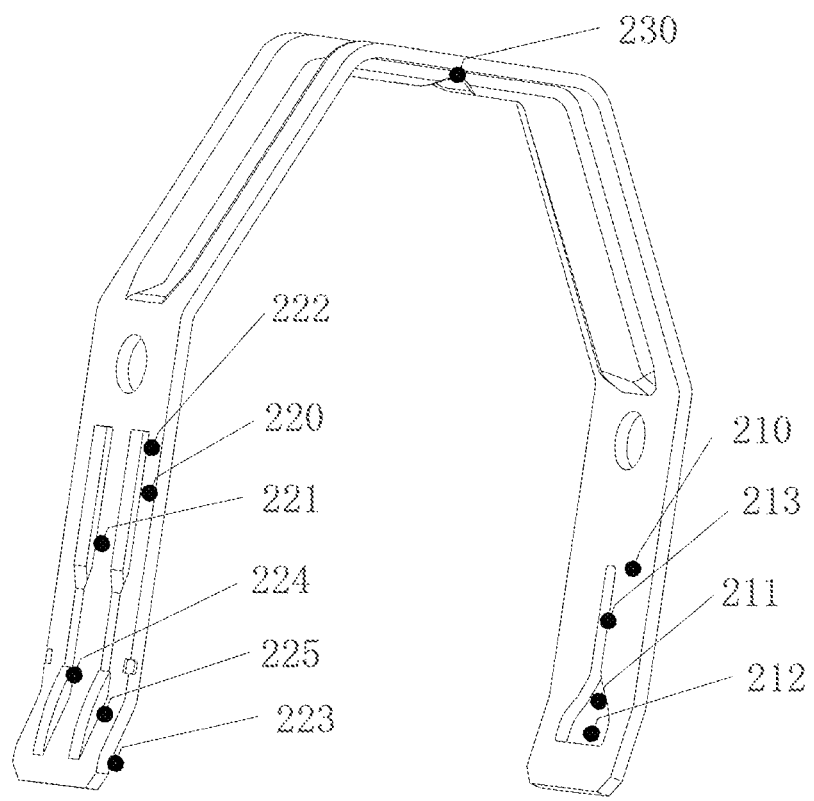
FIG. 3 shows a perspective view of an upper connecting member in one direction according to one embodiment of the present invention.
Figure 4:
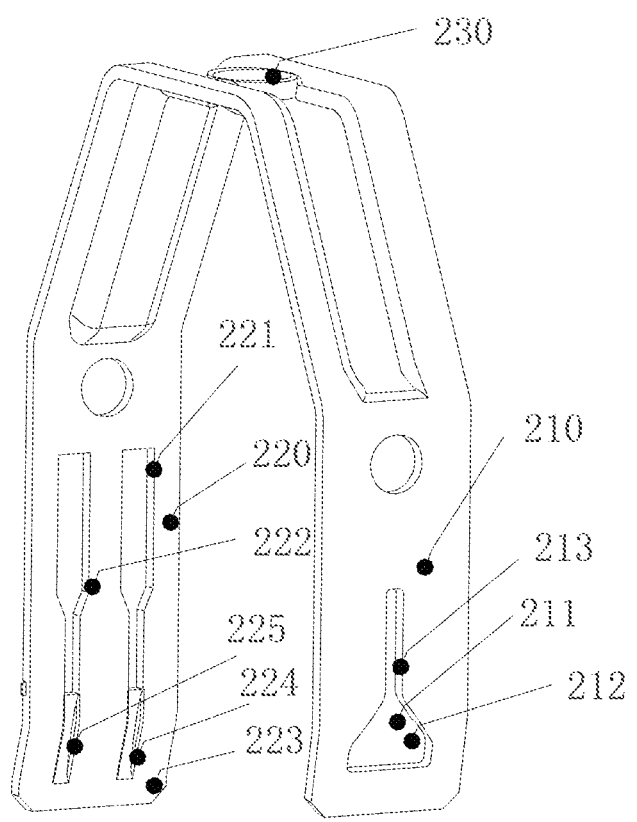
FIG. 4 shows a perspective view of the upper connecting member in another direction according to one embodiment of the present invention.
Figure 5:
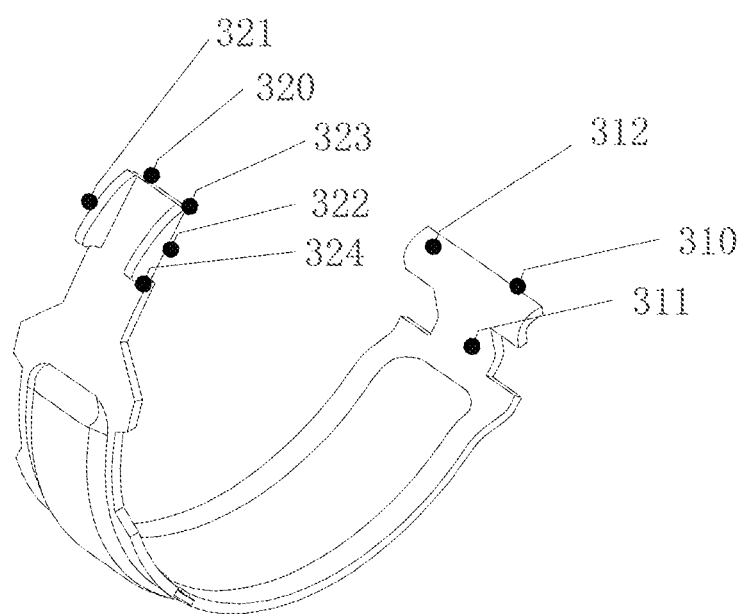
FIG. 5 shows a perspective view of a lower bearing member in one direction according to one embodiment of the present invention.

As shown in FIGS. 1-6, according to one embodiment of the present invention, a suspension device 1 comprises an upper connecting member 2 and a lower bearing member 3. The upper connecting member 2 comprises a first upper jointing portion 210 and a second upper jointing portion 220. Correspondingly, the lower bearing portion 3 comprises a first lower jointing portion 310 and a second lower jointing portion 320. The connection between the upper connecting member 2 and the lower bearing member 3 is achieved through the junctions between the first upper jointing portion 210 and the first lower jointing portion 310 and between the second upper jointing portion 220 and the second lower jointing portion 320. The first upper jointing portion 210 is provided with a first opening 211 having a lower part 212 and an upper part 213, and the first lower jointing portion 310 is substantially T-shaped and has a root part 311 and a head part 312, the root part 311 is configured to rotate freely in the lower part 212 of the first opening 211. As shown in FIG. 4 and FIG. 5, the head part 312 of the first lower jointing portion 310 has a length greater than the maximum width of the lower part 212 of the first opening 211 but less than the overall length of the first opening 211.

The second upper jointing portion 220 is provided with a second opening 221 and a third opening 222 which are elongated. The second lower jointing portion 320 is provided with a second side plate 321 and a third side plate 322 which are configured to be inserted into the second opening 221 and the third opening 222, respectively. The second side plate 321 and the third side plate 322 are provided respectively with an insertion starting end 323 and an insertion tail end 324, and each of the second side plate 321 and the third side plate 322 has a height increasing gradually from the insertion starting end 323 to the insertion tail end 324.

Figure 7:
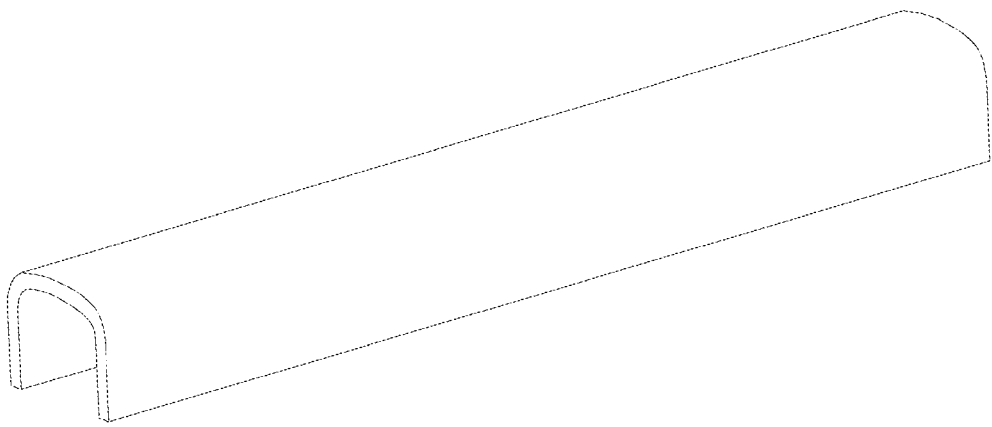
FIG. 7 shows a perspective view of a supporting member according to one embodiment of the present invention.

As shown in FIGS. 3 and 7, the upper connecting member 2 is formed by bending a plate into an arc shape. In another embodiment of the present invention, the upper connecting member 2 further comprises a supporting member 4 arranged, for example by welding, between the first upper jointing portion 210 and the second upper jointing portion 220, for supporting the upper connecting member 2 to prevent the first upper jointing portion 210 and the second upper jointing portion 220 from getting excessively close to each other and to protect the upper connecting member 2 from deformation. Herein, "excessively" means going beyond the scope (appropriate deformations facilitating installation and not compromising structural strength) allowed by the design of the present invention. In the embodiment, the cross-section of the supporting member 4 is C-shaped in order to reduce weight and increase supporting strength. Certainly, in other embodiments, a cylindrical supporting member 4 is also applicable.

As shown in FIG. 5, in one embodiment of the present invention, the lower bearing member 3 is formed by bending a plate into an arc shape. In use, the connection between the upper connecting member 2 and the lower bearing member 3 is facilitated by pressing the second upper jointing portion 220 to deform, and specifically, to allow the second side plate 321 and the third side plate 322 to be inserted conveniently into the second opening 221 and the third opening 222.

As shown in FIG. 5 again, in one embodiment of the present invention, the second side plate 321 and the third side plate 322 are tapered. In another embodiment of the present invention, the second side plate 321 and the third side plate 322 are arc-shaped. After the second side plate 321 and the third side plate 322 are pushed into the second opening 221 and the third opening 222 respectively, since the insertion tail ends 324 of the second side plate 321 and the third side plate 322 are snapped into the second opening 221 and the third opening 222 respectively, a pulling force applied in parallel to the second lower jointing portion 320 is not able to remove the second side plate 321 and the third side plate 322 out from the second opening 221 and the third opening 222.

Figure 8:
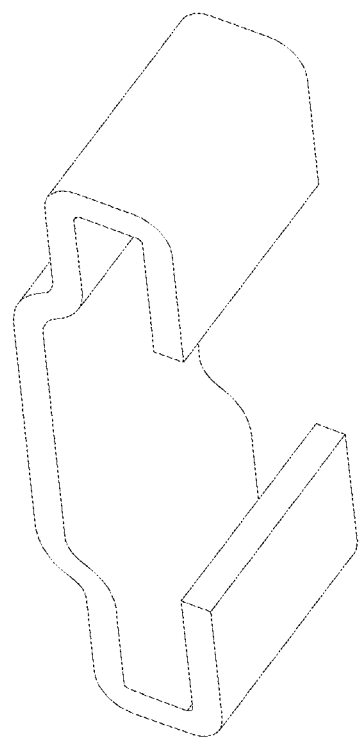
FIG. 8 shows a perspective view of a fastener according to one embodiment of the present invention.
Figure 9:
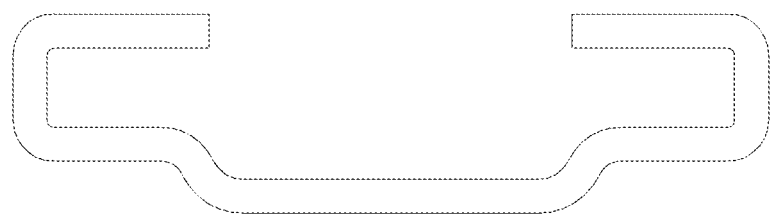
FIG. 9 shows a front view of the fastener according to one embodiment of the present invention.

As shown in FIGS. 8 and 9, in one embodiment of the present invention, the suspension device 1 further comprises a fastener 5. During mounting, the fastener 5 is sleeved on the upper connecting member 2 over the second upper jointing portion 220. The fastener 5 is slided down to a joint where the second upper jointing portion 220 and the second lower jointing portion 320 are connected, whereby relative vertical sliding between the second upper jointing portion 220 and the second lower jointing portion 320 is prevented, such that the second side plate 321 and the third side plate 322 cannot be easily removed out from the second opening 221 and the third opening 222 after the suspension device 1 is mounted, and thus a locking function is realized.

As shown in FIG. 3, in one embodiment of the present invention, a bent distal tail end 223 of the second upper jointing portion 220 is provided with a first groove 224 and a second groove 225 for guiding the second side plate 321 and the third side plate 322 to slide, respectively. By means of the first groove 224 and the second groove 225, the second side plate 321 and the third side plate 322 can be easily inserted into the second opening 221 and the third opening 222, respectively, in a sliding manner.

As shown in FIGS. 3 and 4, in one embodiment of the present invention, the upper connecting member 2 is provided with at least one reinforcing rib for enhancing the strength of the upper connecting member 2.

Figure 6:
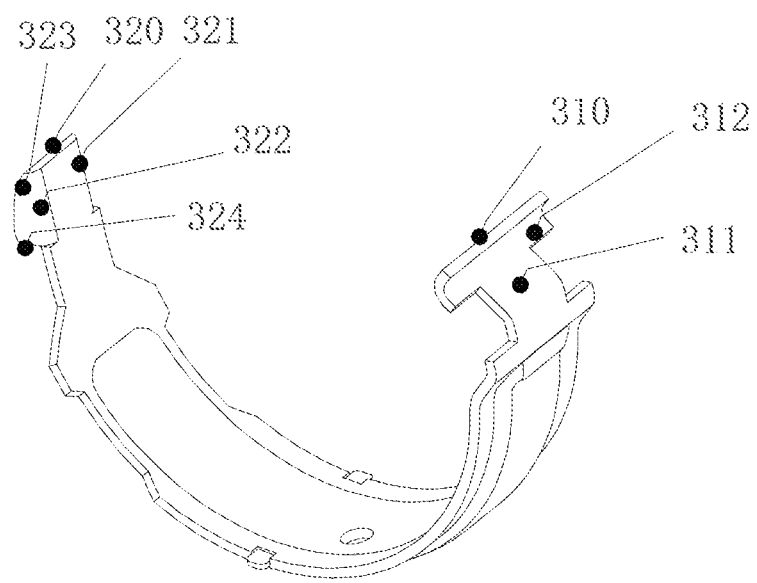
FIG. 6 shows a perspective view of the lower bearing member in another direction according to one embodiment of the present invention.

As shown in FIGS. 5 and 6, in one embodiment of the present invention, the lower bearing member 3 is also provided with at least one reinforcing rib for enhancing the strength of the lower bearing member 3.

The present invention further provides a method for assembling the above-mentioned suspension device 1. According to one embodiment of the present invention, the method comprises the steps of: inserting the head part 312 of the first lower jointing portion 310 into the first opening 211; rotating the root part 311 of the first lower jointing portion 310 of the lower bearing member 3 in the lower part 212 of the first opening 211 by an angle, to align the second side plate 321 and the third side plate 322 with the second opening 221 and the third opening 222, respectively; and pushing the second side plate 321 and the third side plate 322 towards the upper connecting member 2 to insert them into the second opening 221 and the third opening 222, respectively. While disassembling the suspension device 1, pushing the second side plate 321 and the third side plate 322 towards the upper connecting member 2 continuously to remove the second side plate 321 and the third side plate 322 from the second opening 221 and the third opening 222, such that the second lower jointing portion 320 is disengaged from the second upper jointing portion 220; rotating the root part 311 of the first lower jointing portion 310 in the lower part 212 of the first opening 211 by an angle to align the head part 312 of the first lower jointing portion 310 with the upper part 213 of the first opening 211, so as to disengage the first lower jointing portion 310 from the first upper jointing portion 210.

In another embodiment of the present invention, before inserting the second side plate 321 and the third side plate 322 into the second opening 221 and the third opening 222, sleeving the fastener 5 on the second upper jointing portion 220 and inserting the second side plate 321 and the third side plate 322 into the second opening 221 and the third opening 222, respectively; pressing the fastener 5 towards the lower bearing member 3 to cover the joint of the second upper jointing portion 220 and the second lower jointing portion 320, therefore a locking function is achieved. When disassembling the suspension device 1, pushing the fastener 5 upwards, and then pushing the second side plate 321 and the third side plate 322 towards the upper connecting member 2 to remove the second side plate 321 and the third side plate 322 from the second opening 221 and the third opening 222, so as to disengage the second lower jointing portion 320 from the second upper jointing portion 220; rotating the root part 311 of the first lower jointing portion 310 in the lower part 212 of the first opening 211 by an angle to align the head part 312 of the first lower jointing portion 310 with the upper part 213 of the first opening 211, so as to disengage the first lower jointing portion 310 from the first upper jointing portion 210.

In one embodiment of the present invention, the disassembly of the second lower jointing portion 320 from the second upper jointing portion 220 is carried out manually. In another embodiment of the present invention, for example in the case that the suspension device 1 is relatively larger for bearing a heavy load, a tool is needed to disassemble the second lower jointing portion 320 from the second upper jointing portion 220.

In a preferred embodiment of the present invention, the second insertion side plate and the third insertion side plate have an appropriate height to enable easy insertion of the second lower jointing portion 320 into the second upper jointing portion 220, and separation of the second lower jointing portion 320 from the second upper jointing portion 220.

In one embodiment of the present invention, the upper connecting member 2 is provided with a hole 230 through which and a connecting member (such as a screw) matching therewith, the upper connecting member 2 can be positioned. The lower bearing member 3 is used to bear an object.

The above are merely preferred embodiments of the present invention, but the present invention is not limited thereto, and all embodiments should fall within the protection scope of the present invention as long as they achieve the technical effects of the present invention with the same or similar means.

What is claimed is:

1. A suspension device, comprising:
an upper connecting member having a first upper jointing portion and a second upper jointing portion; and
a lower bearing member connected with the upper connecting member and comprising a first lower jointing portion and a second lower jointing portion, wherein a connection between the upper connecting member and the lower bearing member is achieved through junctions between the first upper jointing portion and the first lower jointing portion and between the second upper jointing portion and the second lower jointing portion;
wherein the first upper jointing portion is provided with a first opening, the first opening is substantially symmetrical and has an upper part and a lower part, the upper part of the first opening is elongated and has a substantially rectangular shape, the lower part of the first opening is wider and shorter compared to the upper part of the first opening, and the lower part of the first opening has a substantially triangular shape with two opposite sides converging toward the upper part of the first opening;
wherein the first lower jointing portion is substantially T-shaped and has a head part and a root part, the first lower jointing portion is configured to allow the root part to rotate freely in the lower part of the first opening, and the head part has a length greater than a maximum width of the lower part of the first opening but less than an overall length of the first opening;

wherein the second upper jointing portion is provided with a second opening and a third opening, and the second opening and the third opening are elongated;

wherein the second lower jointing portion is provided with a first side plate and a second side plate, and the first side plate and the second side plate are configured to be inserted into the second opening and the third opening, respectively; and wherein the second upper jointing portion is further provided with a first groove extending downwardly from the second opening and a second groove extending downwardly from the third opening, the first groove and the second groove face the first upper jointing portion and are partially disposed on a bent distal tail end of the second upper jointing portion, and the first groove and the second groove are configured for guiding the first side plate to slide into the second opening and guiding the second side plate to slide into the third opening, respectively.

2. The suspension device of claim 1, wherein each of the first side plate and the second side plate has an insertion starting end, an insertion finishing end, and a height increasing gradually from the insertion starting end to the insertion finishing end.

3. The suspension device of claim 1, wherein the upper connecting member further comprises a supporting member arranged transversely between the first upper jointing portion and the second upper jointing portion.

4. The suspension device of claim 1, wherein the suspension device further comprises a fastener configured to be sleeved on the second upper jointing portion.

5. The suspension device of claim 1, wherein the upper connecting member is provided with at least one reinforcing rib.

6. The suspension device of claim 1, wherein the lower bearing member is provided with at least one reinforcing rib.

* * * * *